Sept. 20, 1932.    J. LEDWINKA    1,878,155
PRESSED METAL VEHICLE BODY
Filed May 26, 1928    3 Sheets-Sheet 1

INVENTOR.
JOSEPH LEDWINKA.
BY
ATTORNEY.

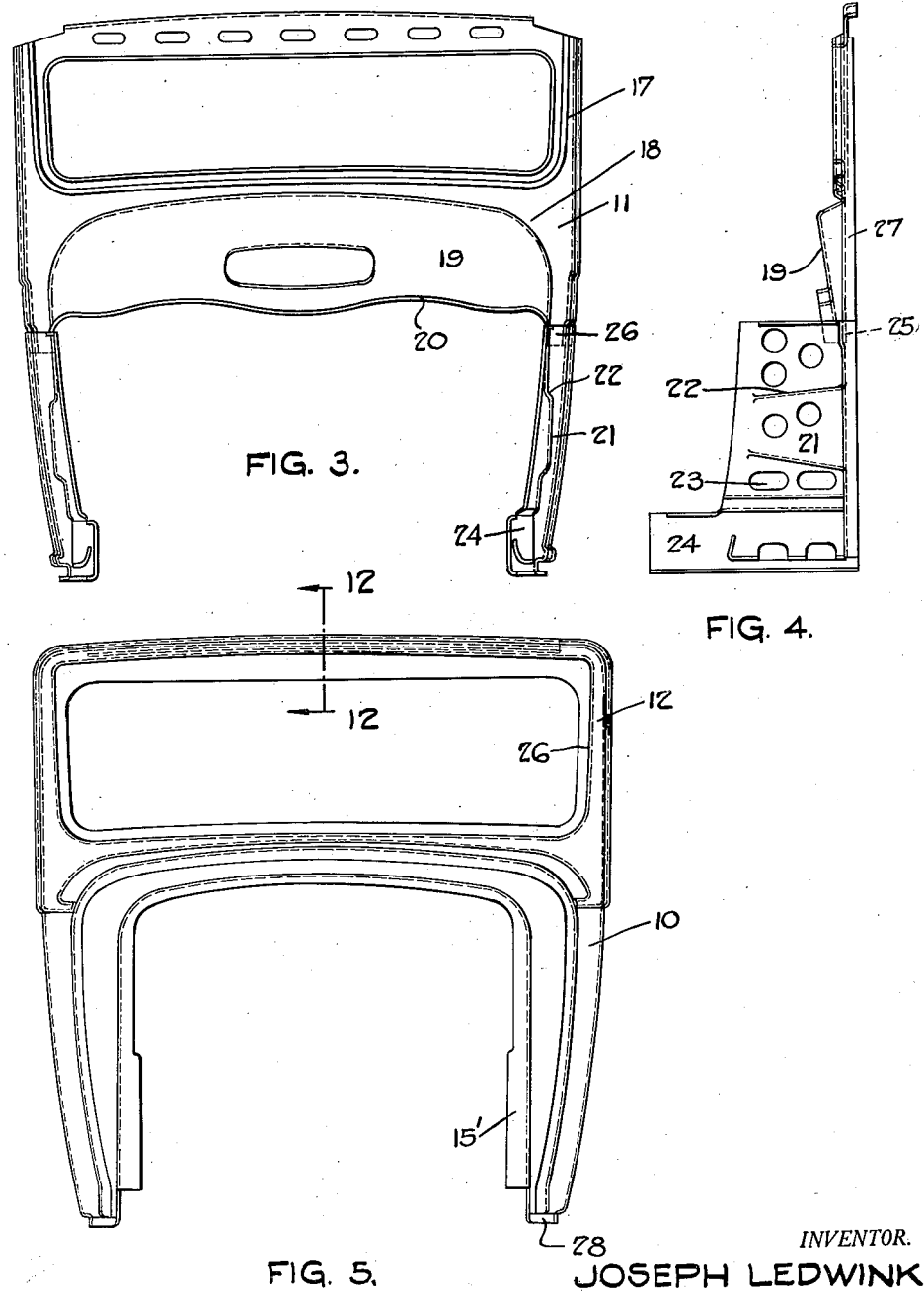

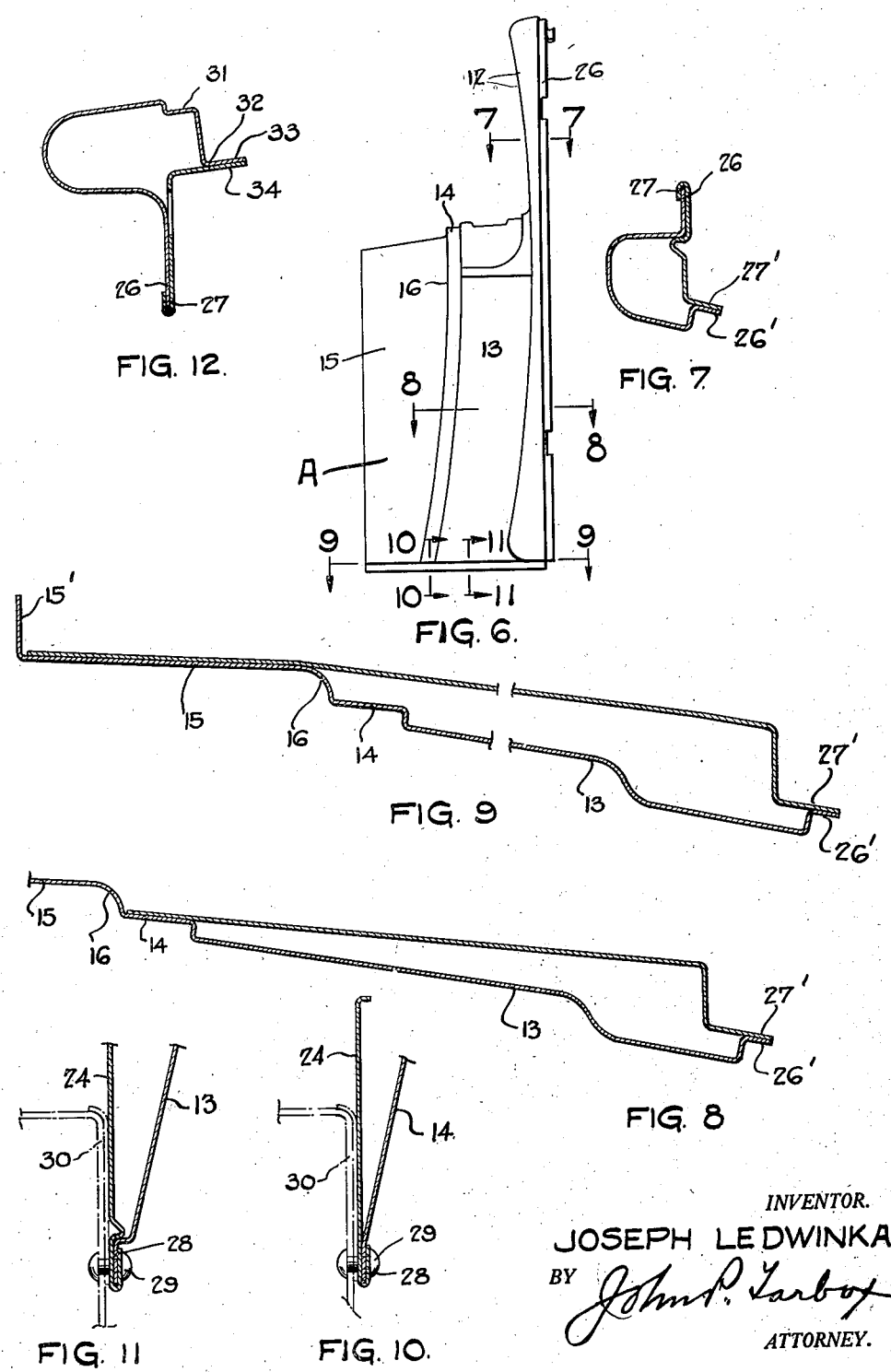

Patented Sept. 20, 1932

1,878,155

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

PRESSED METAL VEHICLE BODY

Application filed May 26, 1928. Serial No. 280,694.

My invention relates to pressed metal vehicle bodies and particularly to such bodies having their walls built up in large part of relatively large stampings forming sub-assembly units, which, when joined together, form a rigid self-supporting body superstructure adapted to be handled, shipped and, if desired, painted and trimmed, prior to their final assembly with an underframe serving as a chassis and carrying all or substantially all of the floor and seat supports, the body superstructure being adapted, in the final assembly with the underframe, to form a unitary combined body and chassis structure.

It has heretofore been proposed to construct the side and front walls of such bodies of large stampings of sheet metal forming inner and outer panels spaced in their bodies and joined together in their margins and the margins of the door and window openings. It has also been proposed to construct such bodies in separate front, side, rear and roof unit sub-assemblies for convenience of manufacture and shipment and to reduce costs.

It is among the objects of my present invention to simplify and otherwise improve the construction of the unit sub-assemblies of such bodies, to further reduce the weight of the complete assembly, to further reduce the cost of manufacture.

I attain these objects generally by substantially eliminating the inner paneling and particularly the large expensive inner panel stampings as heretofore employed in the side unit sub-assemblies, and by also eliminating, furthermore, portions of the inner paneling in the front unit sub-assembly, in short eliminating inner paneling and reinforcement wherever I find I can dispense with it and relying in large measure throughout the greater portion of the body wall, on the inherent strength and stiffness provided by the curvature of the large outer panel stampings extending around door and window openings and on the hollow intercommunicating angle and channel sections provided by the deep flanged construction thereof around said openings and in the outer margins of the panels, where they are joined to adjacent parts in final assembly.

The front unit sub-assembly is simplified and improved by forming the rear cowl portion and the reduced front portion adapted to extend into the hood and forming space for foot room in a single unitary stamping, which may be and preferably is formed integrally with the front of the windshield frame. Also by combining the inner panel stamping around the windshield opening with an integral downwardly extending portion forming the instrument board.

Other and further objects and advantages and the means by which they are attained will become apparent from the further disclosure of the invention in the following detailed description, taken with the accompanying drawings, in which Figs. 3 and 4 are views, respectively, in side elevation and in plan of a body of the sedan type in which I have shown my invention embodied.

Figs. 3 and 4 are veiws, respectively, in front elevation and in side elevation of the inner panel sub-assembly unit of the front unit.

Fig. 5 is a front view in elevation of the outer unitary panel stamping of the front unit.

Fig. 6 is a side elevation of the assembled front unit.

Figure 1:
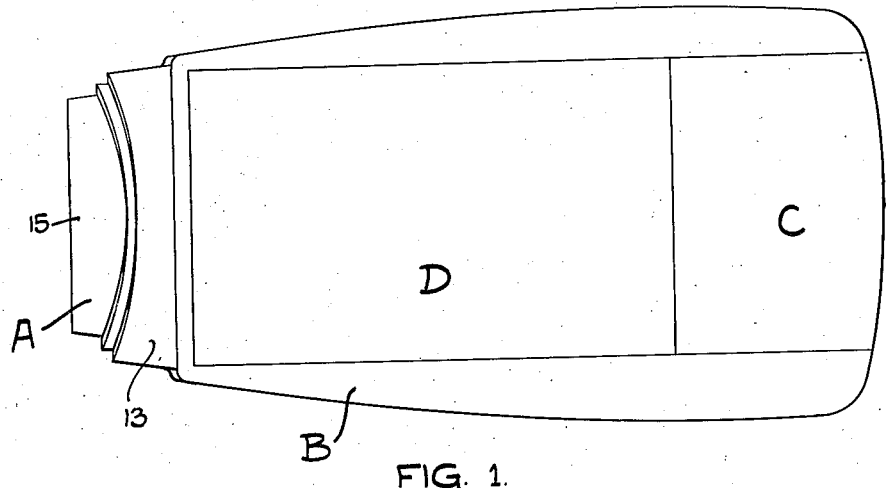

Figs. 7 to 12, inclusive, are detail sectional views taken, respectively, on the correspondingly numbered section lines of Fig. 6.

In the drawings, the front unit is designated generally by the letter A and comprises as heretofore, the cowl and portions of the front door posts and the windshield frame; the side units designated by B extend from the front posts to and around the rear quarters and at the top over the roof quarter to form the sides of the roof; the rear unit designated by C extends from the bottom of the body to and around to rear top quarter and forwardly to a point adjacent the rear door posts; and the roof unit designated by D fits into the rectangular opening between the top edges of the front, side and rear units and is joined thereto along its margins.

According to the present invention, the front unit, as heretofore, is built up out of outer and inner panel sub-assemblies 10 and 11, respectively, the outer panel sub-assembly being preferably a single unitary stamping forming, not only, as heretofore the forward portion of the windshield frame 12 and front door post structures, and a relatively short full-section cowl 13 terminating at the front with a shallow offset portion 14 adapted to receive the rear edge of the hood, but forming also, the forward reduced section cowl extension or sub-cowl 15. Both the full-section cowl 13 and the reduced-section cowl extension 15 are of substantially greater fore and aft dimension or depth than the shallow offset portion 14. The extension 15 is adapted to extend under the hood, and provide foot room for the occupants of the front seat. It is joined to the offset seat 14 of the short rear cowl portion 13 by a smoothly rounded curve 16 which facilitates the forming of these two different sized cowl portions 13 and 14 by die stamping operations. As heretofore constructed this sub-cowl portion had been made as a separate stamping joined to the front edge of the rear cowl portion by relatively complicated joining operations, necessitating riveting and welding and in some cases requiring intermediate parts joining the two offset cowl portions. By the present invention, all of these additional forming and joining operations have been eliminated in the making of the unitary outer front panel stamping 10. The subcowl is flanged inwardly at its front edge at 15'. To this flange may be secured the usual shroud pan (not shown).

Figure 2:
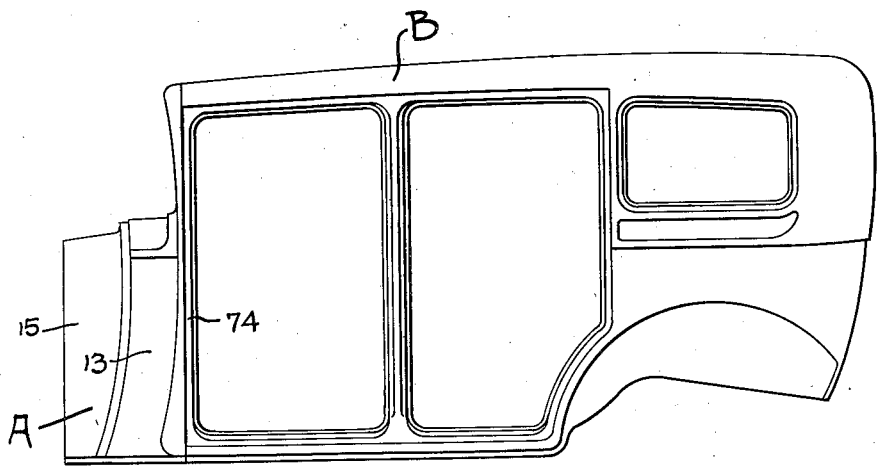

A novel inner panel construction for the front unit is also provided according to my invention. As shown in Figs. 2 and 3, the windshield frame portion 17 of the inner panel is extended downwardly at 18 and a portion of this downward extension is offset forwardly and forms the instrument board 19 as an integral portion of the windshield frame stamping. At its lower edge the instrument board portion 19 is formed with a usual forwardly extending stiffening flange 20. In the upper transverse portion of the cowl, the inner panel is not applied, as heretofore, to form a hollow reinforced cowl structure, and thus the cowl is lightened to that extent without substantial sacrifice of strength, for the integral instrument board supplies all the strengthening of this portion of the cowl that is needed. At the sides of the cowl where it is joined to the underframe or chassis, the outer panel is reinforced and strengthened by the vertical inner panel cowl side portions 21 which may be provided as shown with offset strengthening ribs 22 and lightening holes 23. Throughout the greater part of their height the side portions 21 are of a depth equal to the depth 13 of the outer cowl panel, but in their lower portions, where additional strength and reinforcement is desirable so that the cowl may be securely anchored to the underframe or chassis, they are extended forwardly at 24 to the full depth of the combined cowl 13 and sub-cowl 15.

The inner panel cowl side portions 21 are preferably formed as separate stampings and integrally secured as by welding to downward projections overlapping portions 25 at the sides of the combined windshield frame and instrument board stamping 17, 19, to form the complete inner panel sub-assembly for the front unit.

The inner and outer front panel sub-assemblies 10 and 11 shown separately in Figs. 3, 4 and 5 are assembled to form the front unit A, Fig. 6 in the manner clearly shown in the sectional views Figs. 7 to 12, inclusive.

In the margins of the windshield opening they are connected by the clinched joinder 26 and 27 which may, if desired, be supplemented by spot welding. In their rear vertical margins they are connected together by spot welding or otherwise through their adjacent offset edge flanges 26' and 27'. In their front vertical margins the inner panel portions 21 are spot welded to the outer panel stamping 10 in the offsets 14 and at the bottom the extensions of the inner side panels— as is made clear by the showing in Fig. 9—are joined as by spot welding to the forward reduced cowl portion 15 of the outer panel. Along their lower side edges the panels are joined by clinching as shown 28 and through this clinched portion they are joined by rivets 29 in the final assembly, to the underframe or chassis the sills 30 of which are indicated in dotted lines, Figs. 10 and 11. At the top the outer panel forms the front of the roof, and is formed at its rear edge with a double rabbet 31, 32 to receive the front edge of the roof unit D. The adjacent edges 33 and 34 of the inner and outer panels are here joined, as by spot welding.

So constructed and united, the inner and outer unitary sub-assembly panels 10 and 11 of the front unit forms an exceedingly rigid and strong although very light front unit sub-assembly, in the production of which there is a substantial saving in material and in forming and assembling operations.

The manner of assembly of the units forming the body proper or body superstructure is similar to that heretofore proposed, the side units being joined to the front unit by riveting or otherwise securing the flanges 74 at the front vertical edges of the side units B to the welded together flanges 26, 27 of the front unit A, and to the rear unit in a manner not necessary to describe herein.

The four units, front, side and rear, so joined for a rigid self-supporting structure which can be handled and shipped, and if desired, painted and trimmed, prior to its assembly with the underframe or chassis and prior to assembly with the roof unit D. The roof unit D may be an all steel panel or any other usual roof construction, and may be assembled before or after the body superstructure is painted and trimmed or before or after it is shipped from the body manufacturer to the automobile manufacturer. When the roof unit is assembled by connecting it to the rabbeted flanges of the front, side and rear units it still further stiffens and strengthens the body structure, and the unity of the structure is enhanced if the roof panel is also a sheet metal panel.

The body so constructed is very light in weight, has the beauty of line which can be obtained by the large steel stampings, is very roomy in its interior, because of the minimum of interior bracing, the paneling of the outer shell forming in large measure the combined frame and body, and it is very strong and rigid by reason of its deep drawn hollow intercommunicating angle and channel cross sections framing the door and window openings and reinforcing the edges of the large outer panel stampings and by reason of the flanged joints between the adjacent panels forming additional bracing and reinforcing means. The location and extent of the inner reinforcing and bracing stampings, adds the additional strength where it is needed.

While I have herein described a specific embodiment of my invention which is at present believed by me to be the preferred embodiment, it will be understood that various changes and modifications may be made without departing from the spirit and scope of the appended claims:

What I claim is:—

1. In a vehicle body construction, an outer cowl panel formed by a unitary stamping and having an offset therein at top and sides forming a forward extended cowl portion of reduced cross section extending a substantial distance under a hood, and an inner reinforcing panel for each of the sides of said outer panel joined to the bottom and rear edges of said sides and terminating adjacent the top of said sides.

2. In a vehicle body construction, an outer cowl panel formed by a unitary stamping and having an offset therein at top and sides forming a forward cowl portion of reduced cross section extending a substantial distance under a hood, and an inner reinforcing panel for the sides of said outer panel, extended at the bottom to the full depth of the cowl but terminating in its upper portion at said offset.

3. In a vehicle body construction, an inner cowl panel comprising a portion extending around the windshield frame and extended downwardly intermediate the sides to form an instrument board, and, at the sides, extended downwardly and forwardly to form reinforcements for the sides of the cowl.

4. In a vehicle body construction, a cowl panel formed of a unitary stamping and having extended forward and rear portions joined by an offset portion, and an inner panel reinforcing the sides of said cowl panel and directly joined thereto in its rear margin and in said offset portion.

In testimony whereof I hereunto affix my signature.

JOSEPH LEDWINKA.